United States Patent [19]

Kazami et al.

[11] Patent Number: 5,504,546
[45] Date of Patent: Apr. 2, 1996

[54] INFORMATION RECORDING DEVICE FOR CAMERA WITH FUNCTION FOR CONTROLLING INFORMATION RECORDING POSITION ON FILM

[75] Inventors: Kazuyuki Kazami; Norikazu Yokonuma, both of Tokyo; Hideo Hibino, Kawasaki, all of Japan

[73] Assignee: Nikon Corporation, Tokyo, Japan

[21] Appl. No.: 305,662

[22] Filed: Sep. 9, 1994

Related U.S. Application Data

[63] Continuation of Ser. No. 180,781, Jan. 10, 1994, abandoned, which is a continuation of Ser. No. 921,683, Jul. 30, 1992, abandoned.

[30] Foreign Application Priority Data

Aug. 5, 1991 [JP] Japan .................................. 3-219244

[51] Int. Cl.⁶ ........................ G03B 17/24; G03B 1/18
[52] U.S. Cl. ........................ 354/106; 354/173.11
[58] Field of Search ........................ 354/105, 106, 354/173.1, 173.11

[56] References Cited

U.S. PATENT DOCUMENTS

| | | | |
|---|---|---|---|
| 4,311,377 | 1/1982 | Matteson | 354/217 |
| 4,500,183 | 2/1985 | Tanikawa | 354/21 |
| 4,860,037 | 8/1989 | Harvey | 354/21 |
| 4,864,332 | 9/1989 | Harvey | 354/21 |
| 4,878,075 | 10/1989 | Cannon | 354/173.1 |
| 4,977,419 | 12/1990 | Wash et al. | 354/106 |
| 5,021,820 | 6/1991 | Robison et al. | 354/106 |
| 5,130,728 | 7/1992 | Goto et al. | 354/105 |
| 5,184,161 | 2/1993 | Egawa | 354/105 |

Primary Examiner—M. L. Gellner
Assistant Examiner—Eddie C. Lee
Attorney, Agent, or Firm—Shapiro and Shapiro

[57] ABSTRACT

Information recording device according to the invention is of the type which records information in an information recording area of each image frame on a film, as the film is advanced by film feeding mechanism. The device comprises an information recording head positioned downstream, with respect to the film feeding direction, of the front end of the information recording area of the image frame opposed to an exposure aperture of the camera; a timer for measuring the time elapsed after the start of film feeding by the film feeding mechanism; and a controller for causing the information recording head to start the information recording in the information recording area of the film when the timer measures a time required, after the start of film feeding, for the front end of the information recording area to reach the information recording head.

18 Claims, 11 Drawing Sheets

→ FILM FEEDING DIRECTION

INFORMATION RECORDING DEVICE FOR CAMERA WITH FUNCTION FOR CONTROLLING INFORMATION RECORDING POSITION ON FILM

This is a continuation of application Ser. No. 08/180,781 filed Jan. 10, 1994, now abandoned, which is a continuation of application Ser. No. 07/921,683 filed Jul. 30, 1992, abandoned.

BACKGROUND OF THE INVENTION

1. Field of the Invention

The present invention relates to an information recording device for use in a camera, for recording information on a film, and more specifically to such information recording device with a function to control the information recording position on the film.

2. Related Background Art

There is already known an information recording device for use in a camera, for recording information on phototaking of each frame, such as exposure value and date, in an information recording position corresponding to each image frame on a film.

The information recorded on the film is reproduced in the photofinishing laboratory, and the printing of each image frame is executed according to the information of each frame. Consequently said information has to be securely recorded in a predetermined recording area, corresponding to each frame, on an information recording track.

Said information may be recorded on the film in an encoded form, consisting of a combination of long and short optical or magnetic signals corresponding to digital signals 1 and 0. However, if the film feeding speed varies at the information recording, the interval of the recorded signals may vary from the predetermined value, so that the proper information on phototaking may not be decoded from the recorded signals.

In order to avoid such drawback, it is conceivable to delay the start of information recording, by means of a timer after the start of film feeding, until the film speed becomes constant.

FIG. 14 shows a configuration in which an image frame 101 of a film 100 is positioned corresponding to a phototaking position, namely an exposure aperture of a camera, and an information recording head MH2 is positioned at the downstream end, in the film feeding direction, of an information recording area 101R of said image frame 101. In a frame advancement after the phototaking of the frame 101, the photographic information of said frame 101 is recorded by the head MH2 in the information recording area 101R. In this operation, the start of information recording is delayed, after the start of feeding of the film 100, until the film feeding speed becomes constant, so that the information recording is started from a position K in said information recording area 101R.

However, in such simple delay of the start of the information recording, the information recording area is not utilized from the front end, in the film feeding direction but becomes narrower corresponding to the delay of start of recording, so that the capacity of information recording becomes inevitably limited.

SUMMARY OF THE INVENTION

The object of the present invention is to provide an information recording device capable of recording information from the starting end of an information recording area defined for each image frame on the film, thereby securing a sufficient information recording capacity for each image frame, and still enabling stable information recording.

The information recording device of the present invention is of the type which records information on an information recording area of each image frame on a film as the film is advanced by film feeding means.

The device comprises:

information recording means provided in a downstream position in the film feeding direction, with respect to the front end of the information recording area corresponding to an image frame opposed to an exposure aperture of the camera, for recording information in the information recording area;

timer means for measuring the time elapsed after the start of film feeding by film feeding means; and control means adapted for causing the information recording means to start the information recording in the information recording area of the film after the measurement, by the timer means, of a time required, after the start of film feeding, for the front end of the information recording area to reach the information recording means.

In another aspect of the present invention, the device comprises:

information recording means provided in a down-stream position in the film feeding direction, with respect to the front end of the information recording area corresponding to an image frame opposed to an exposure aperture of the camera, for recording information in the information recording area;

film feed amount measuring means for measuring the feed amount of the film fed by film feeding means; and control means adapted for causing said information recording means to start the information recording in the information recording area of the film when the film feed amount, measured by the film feed amount measuring means, reaches an amount corresponding to the distance from the information recording means to the front end of the information recording area.

DESCRIPTION OF THE PREFERRED EMBODIMENTS

Figure 1:
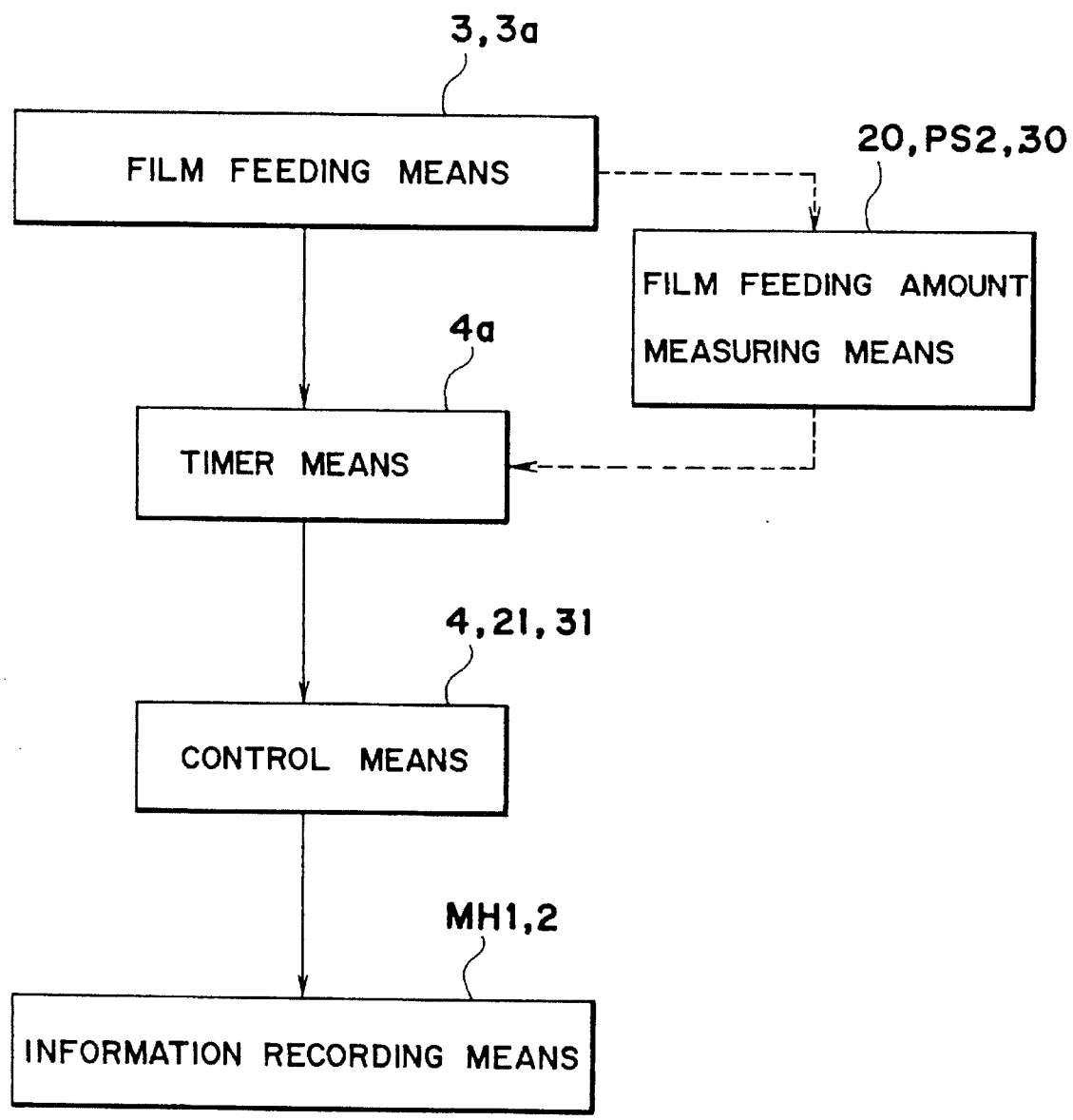
FIG. 1 is a block diagram showing schematic configuration of the device of the present invention.

At first the device of the present invention will be outlined with reference to FIG. 1.

The device of the present invention comprises information recording means MH1 provided in a downstream position in the film feeding direction, with respect to the front end of an information recording area, for recording information in said information recording area; timer means 4a for measuring the time elapsed after the start of film feeding by film feeding means 3, 3a; and control means 4 adapted for causing the information recording means MH1, 2 to start the information recording in the information recording area, when said timer means 4a measures, after the start of film feeding, a time required for the front end of the information recording area to reach the information recording means MH1.

In another aspect of the present invention, the device comprises information recording means MH1 provided in a downstream position in the film feeding direction, with respect to the front end of an information recording area, for recording information in said information recording area; film feed amount detecting means 20, PS2, 30 for detecting the feed amount of the film fed by film feeding means 3, 3a; and control means 21, 31 adapted for causing the information recording means MH1, 2 to start the information recording in the information recording area, when the film feed amount detected by said film feed amount detecting means 20, PS2, 30 reaches an amount corresponding to the distance from the information recording means MH1 to the front end of the information recording area.

Figure 2:
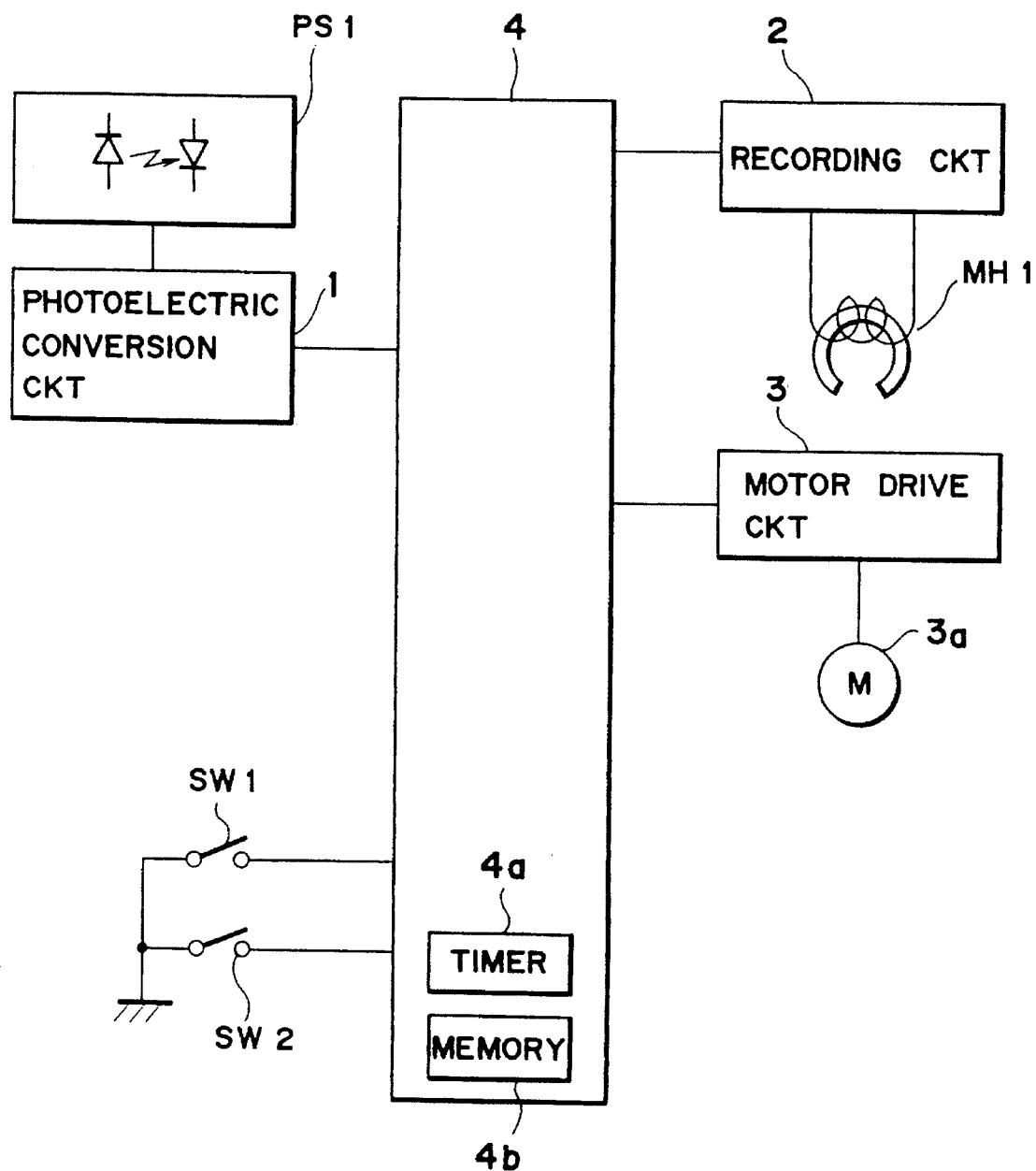
FIG. 2 is a block diagram of a first embodiment of the device of the present invention.

FIG. 2 is a block diagram showing configuration of a first embodiment.

Referring to FIG. 2, there are shown a photoelectric conversion circuit 1 for detecting perforations on the film by a perforation detector PS1 consisting of a light-emitting element and a light-receiving element and converting the detected signals into electrical signals; a recording circuit 2 for driving a magnetic recording head MH1 to record information on a magnetic track on the film; a motor drive circuit 3 for driving a film feeding motor 3a for feeding the film; a control circuit 4 composed of a microcomputer and peripheral components such as a timer 4a and a memory 4b and adapted to execute the sequence control of the camera and various calculations, and also to control the information recording position by executing a control program to be explained later; a switch SW1 to be closed when an unrepresented shutter release button is depressed by a half stroke; and a switch SW2 to be closed when the shutter release button is depressed by a full stroke.

In the above-explained configuration, the motor drive circuit 3 and the film feed motor 3a constitute the film feeding means; the timer 4a constitutes the timer means; the control circuit 4 constitutes the control means; and the magnetic recording head MH1 and the recording circuit 2 constitute the information recording means.

Figure 3:
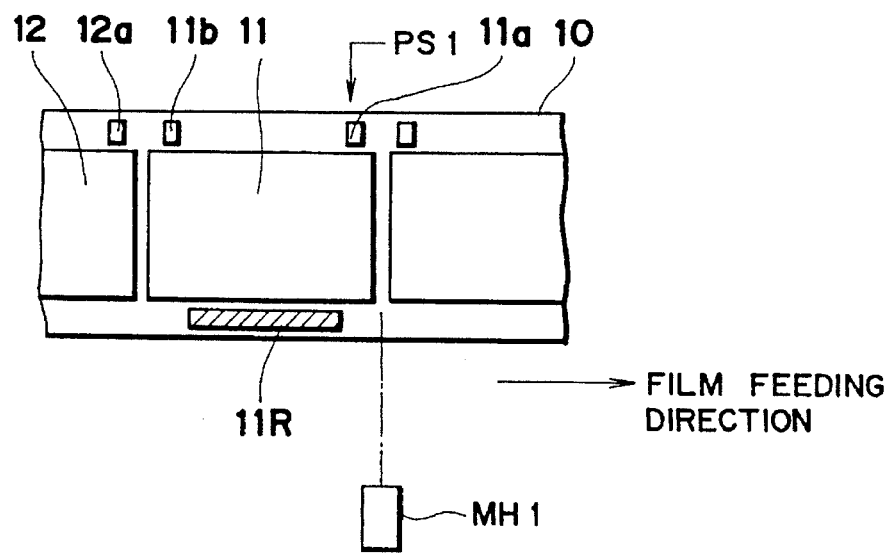
FIG. 3 is a view showing an example of the film employed in the first embodiment and its positional relationship to a magnetic recording head and a perforation detector.

FIG. 3 shows an example of the film employed in the first embodiment, and its positional relationship with the magnetic recording head MH1 and the perforation detector PS1. In the present embodiment, there is employed a film 10 bearing an information recording area and two perforations for each image frame.

The positional relationship between the image frame and the information recording area corresponding thereto has to be precisely defined for example by suitable standards, since otherwise the phototaking information corresponding to each image frame may not be properly reproduced at the printing operation in the photofinishing laboratory. Also if said positional relationship varies from a camera to another, in case a film partly exposed in a camera is re-loaded in another camera, the information of a newly exposed frame may be superposed in the already recorded information recording area of an already exposed frame, even though the double exposure of an image frame can be prevented.

Referring to FIG. 3, it is assumed that an image frame 11 of the film 10 is opposed to an exposure aperture of an unrepresented camera. According to the present invention, the magnetic recording head MH1 is provided in a predetermined downstream position, in the film feeding direction, with respect to the front end of the information recording area 11R. The distance from the front end of the information recording area 11R to the magnetic recording head MH1 is selected at least equal to a distance corresponding to a film feed amount required for the film 10 to reach a constant feed speed after the start of film feeding. Also the perforation detector PS1 is positioned corresponding to a perforation 11a of the image frame 11 opposed to the exposure aperture. In the following description, the perforation 11a at the downstream side of each image frame in the film feeding direction shall be called the first perforation, and another perforation 11b in the upstream side of each image frame shall be called the second perforation.

Figure 5:
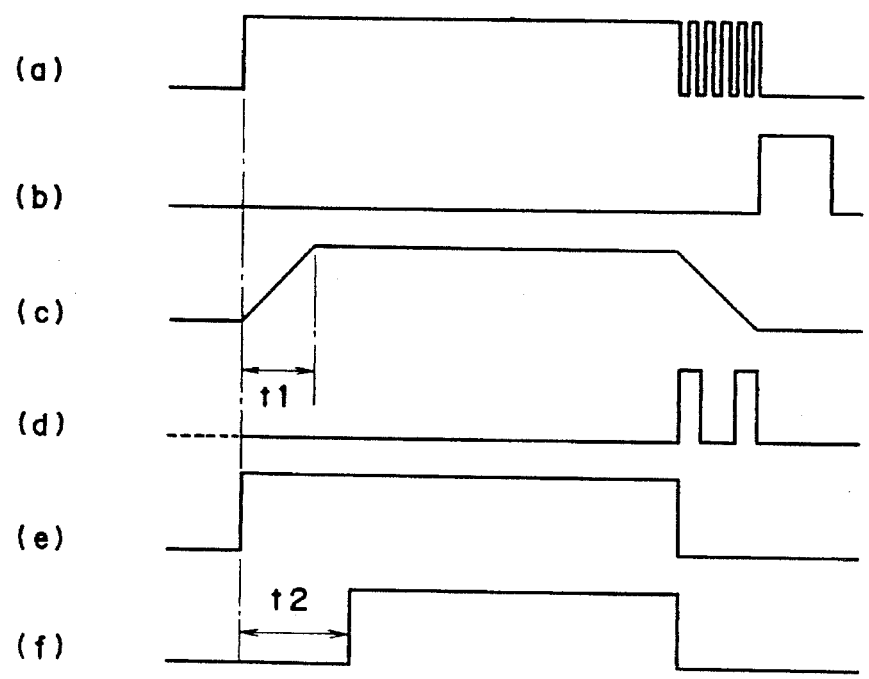
FIG. 5 is a timing chart showing signals in various parts of the device of the first embodiment.
Figure 4:
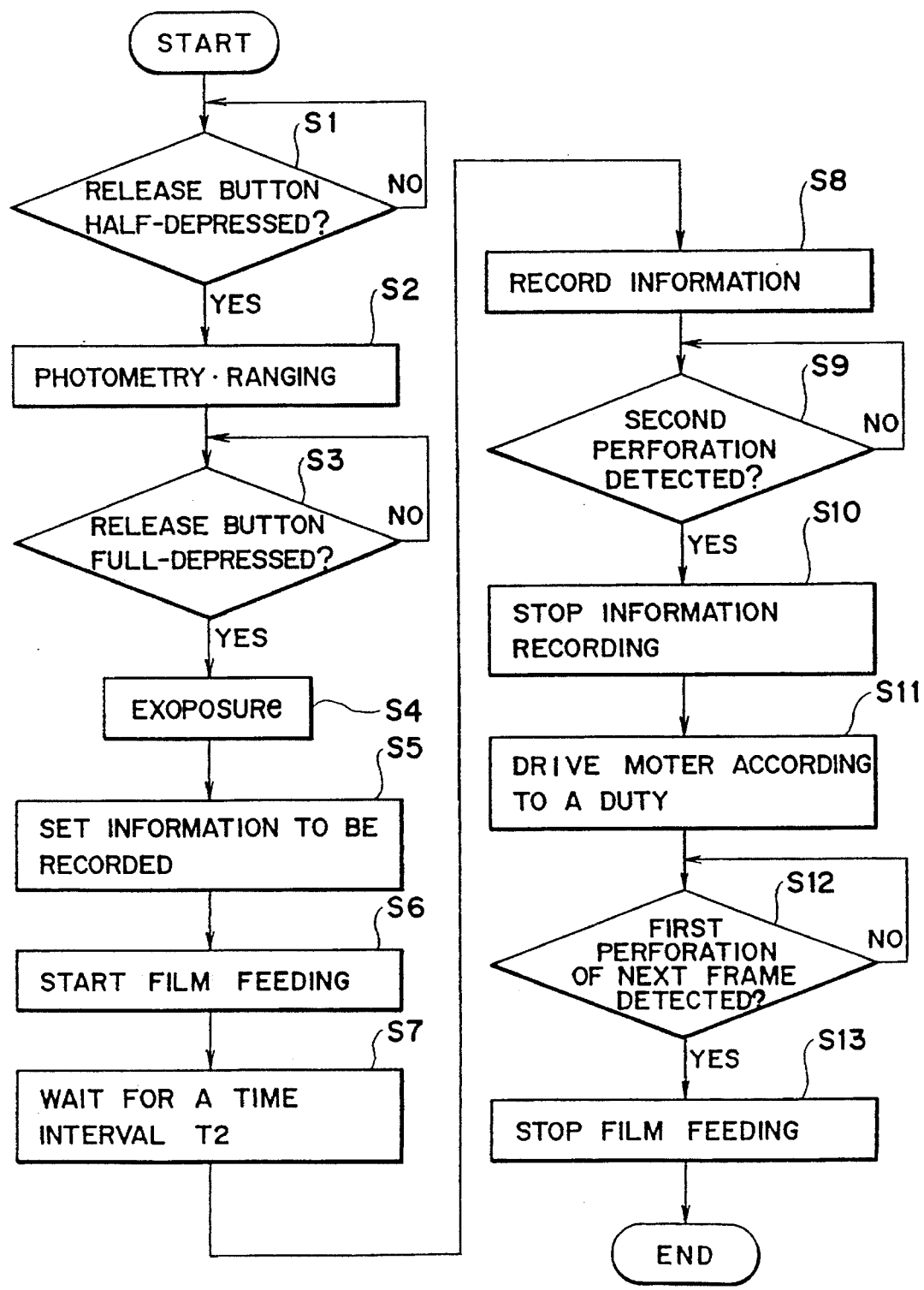
FIG. 4 is a flow chart showing an example of the control sequence for information recording position in the first embodiment.

FIG. 4 is a flow chart showing an example of the control sequence for the information recording position, to be executed by the micro-computer, and FIG. 5 is a timing chart showing signals of various parts of the device shown in FIG. 2. FIG. 5 shows (a) a drive signal for the film feeding motor 3a, (b) a brake signal for the film feeding motor 3a, (c) the feeding speed of the film 10, (d) a perforation detection signal released from the perforation detector PS1, (e) a recording signal in case the information recording is started immediately after the activation of the motor 3a, namely immediately after the start of film feeding, and (f) a recording signal in case the information recording is started after the lapse of a time t2 from the activation of the motor 3a. In the following there will be explained the function of the first embodiment, with reference to FIGS. 2 to 5.

At first a step S1 discriminates, by the state of the switch SW1, whether the shutter release button has been depressed by a half stroke, and, if depressed, a step S2 controls unrepresented light metering device and distance measuring device to effect the light metering and the distance measurement in the already known manner. Then a step S3 discriminates, by the state of the switch SW2, whether the shutter release button has been depressed by a full stroke, and, if depressed, a step S4 controls an unrepresented exposure control device to expose the image frame 11. Then a step S5 memorizes the phototaking information of the image frame 11, such as the shutter speed, diaphragm aperture value, phototaking date etc. in the memory 4b, and a subsequent step S6 controls the motor drive circuit 3 to activate the film feeding motor 3a, thereby starting the feeding of the film 10. The speed of the film 10 fed by the film feeding motor 3a starts to increase immediately after the activation of the motor 3a as shown in FIG. 5(c) and reaches a constant value after a time t1. If the information recording is started during this start-up period of the motor 3a, the interval of the recorded information signals varies as explained above, so that the phototaking information may not be properly decoded from the recorded signals.

A step S7 waits for a time t2 preset in the timer 4a. Said preset time t2 of the timer 4a corresponds to a time required for the front end of the information recording area 11R to reach the magnetic recording head MH1 after the start of film feeding, and is determined in consideration of eventual vibrations in the temperature, power supply voltage etc. A subsequent step S8 controls the recording circuit 2, thereby starting the recording of phototaking information of the image frame 11, stored in the memory 4b. Thus the phototaking information of the image frame 11 is recorded from the front end of the information recording area 11R of said frame 11. A step S9 discriminates whether the second perforation 11b of the frame 11 has been detected, and, if detected, the sequence proceeds to a step S10, but, if not detected, the sequence returns to the step S8. The step S10 terminates the information recording, and a step S11 initiates the duty drive for the motor 3a to decelerate the film 10 as shown in FIG. 5(a), in order to stop the film 10 at a proper stop position. Then a step S12 discriminates whether the first perforation 12a of a next image frame 12 has been detected, and, if detected, a step S13 supplies the motor 3a with a braking signal as shown in FIG. 5(b) thereby terminating the film feeding.

In the timing chart in FIG. 5, the information recording capacity in case (f), where the information recording is started after the preset time t2 of the timer 4a from the start of film feeding in consideration of the start-up time t1 of the motor 3a, appears less than that in case (e) where the information recording started immediately after the start of film feeding, but said capacity is in fact larger than that in the conventional device, since the magnetic recording head MH1 in the present invention is positioned downstream, in the film feeding direction, of the front end of the information recording area 11R.

Thus, as the magnetic recording head MH1 is provided in a downstream position, in the film feeding direction, with respect to the front end of the information recording area of an image frame opposed to the exposure aperture and the information recording is started after the measurement of a time, from the start of film feeding, required for the front end of the information recording area to reach the magnetic recording head MH1, it is rendered possible to record the information from the front end of the recording area corresponding to the image frame and to secure sufficient information recording capacity for each image frame. Also since the magnetic recording head MH1 is placed at the downstream position in the film feeding direction, in such a manner that the film feeding speed becomes constant by the time the front end of the information recording area reaches the magnetic recording head MH1, the encoded phototaking information can be precisely recorded and properly decoded at the signal reproduction.

In the following there will be explained a second embodiment employing a pulse generator for generating a pulse signal for every predetermined amount of film feeding, and starting the information recording upon detection of a film feeding amount required for the front end of the information recording area 11R to reach the magnetic recording head MH1.

Figure 6:
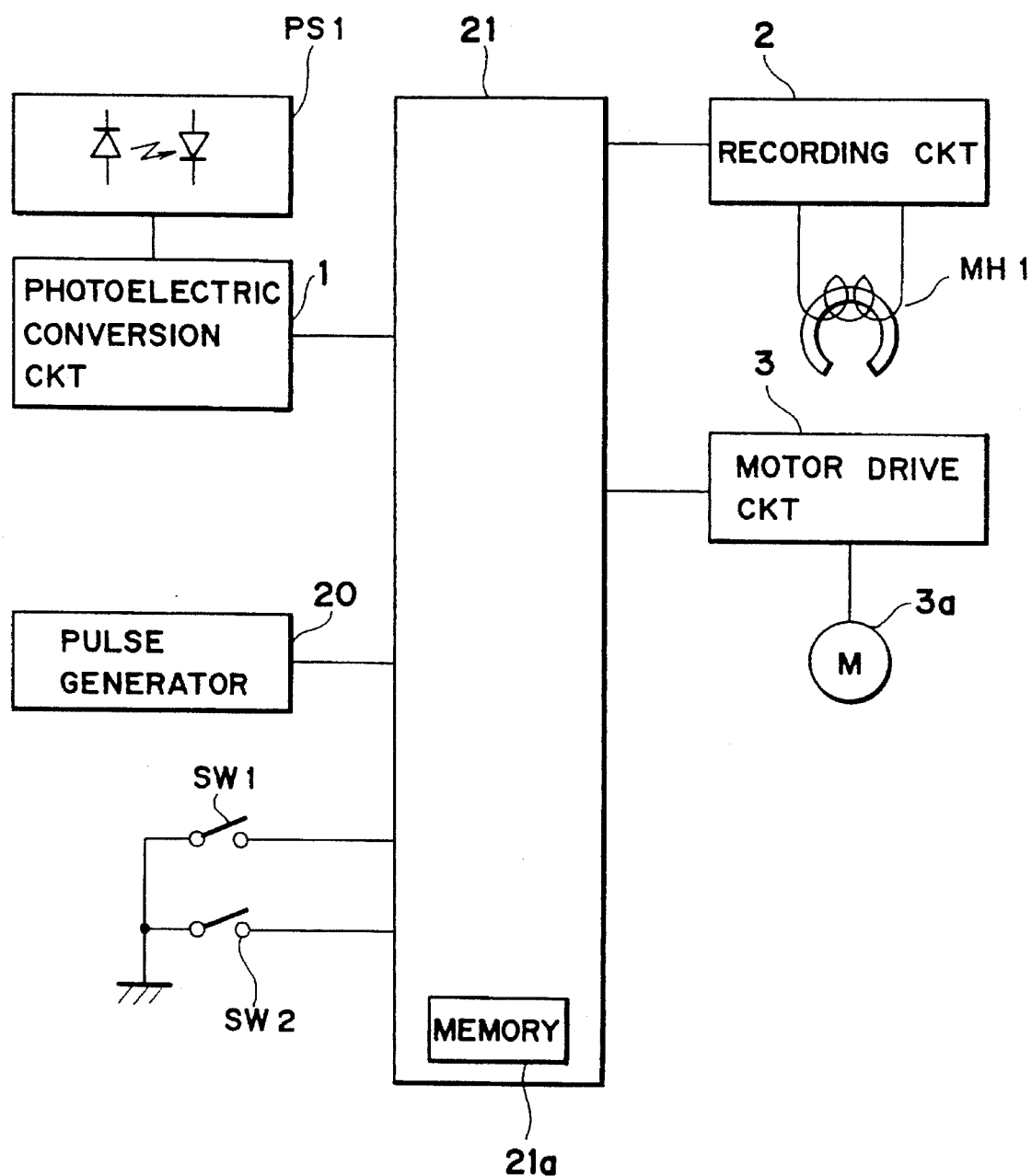
FIG. 6 is a block diagram of a second embodiment.

FIG. 6 is a block diagram showing the configuration of the second embodiment, wherein components equivalent to those in FIG. 2 are represented by same symbols, and the description will be given to the parts different from the foregoing embodiment.

A pulse generator 20 generates a pulse signal for every predetermined amount of feeding of the film 10. A control circuit 21, composed of a microcomputer and peripheral components such as a memory 21a, executes the sequence control of the camera and other various calculations, and also controls the information recording position by executing a control program to be explained later. Said memory 21a is used for storing the phototaking information.

In the above-explained configuration, the motor drive circuit 3 and the film feeding motor 3a constitute the film feeding means; the pulse generator 20 constitutes the film feed amount detecting means; the control circuit 21 constitutes the control means; and the magnetic recording head MH1 and the recording circuit 2 constitute the information recording means.

Figure 7:
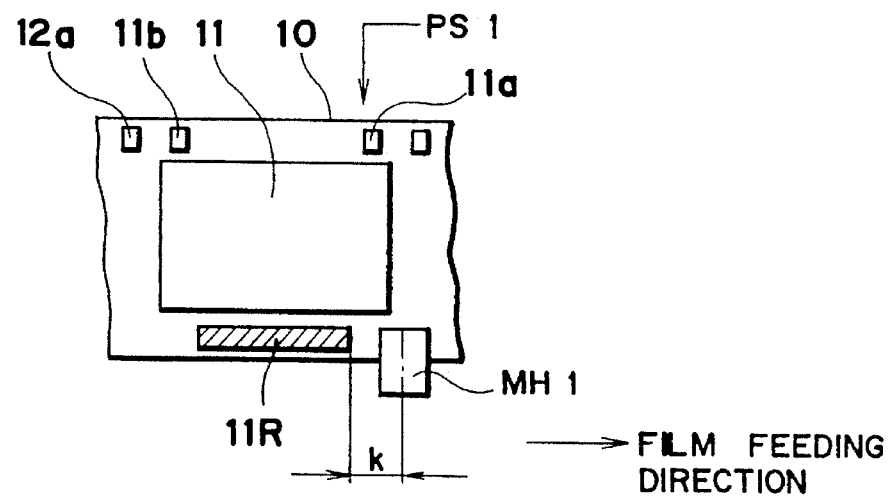
FIG. 7 is a view showing an example of the film employed in the second embodiment and its positional relationship to a magnetic recording head and a perforation detector.

FIG. 7 illustrates the positional relationship between the film and the magnetic recording head MH1 and the perforation detector PS1. Said film is identical with that shown in FIG. 3 and will not, therefore, be explained further. It is assumed that an image frame 11 of the film 10 is positioned opposite an exposure aperture.

The magnetic recording head MH1 is provided at a downstream position, in the film feeding direction, separate by a distance k from the front end of the information recording area 11R of the image frame 11 positioned opposite the exposure aperture. Therefore, the phototaking information of the image frame 11 can be recorded from the front end of said information recording area 11R, by detecting, by means of the pulse generator 20, a feed amount of the film 10 corresponding to the distance k after the start of film feeding and starting the information recording upon detection of such film feed amount. Said distance k, from the front end of the information recording area 11R to the magnetic recording head MH1 is selected at least equal to a film feeding amount required to reach a constant film feeding speed after the start of film feeding.

Figure 9:
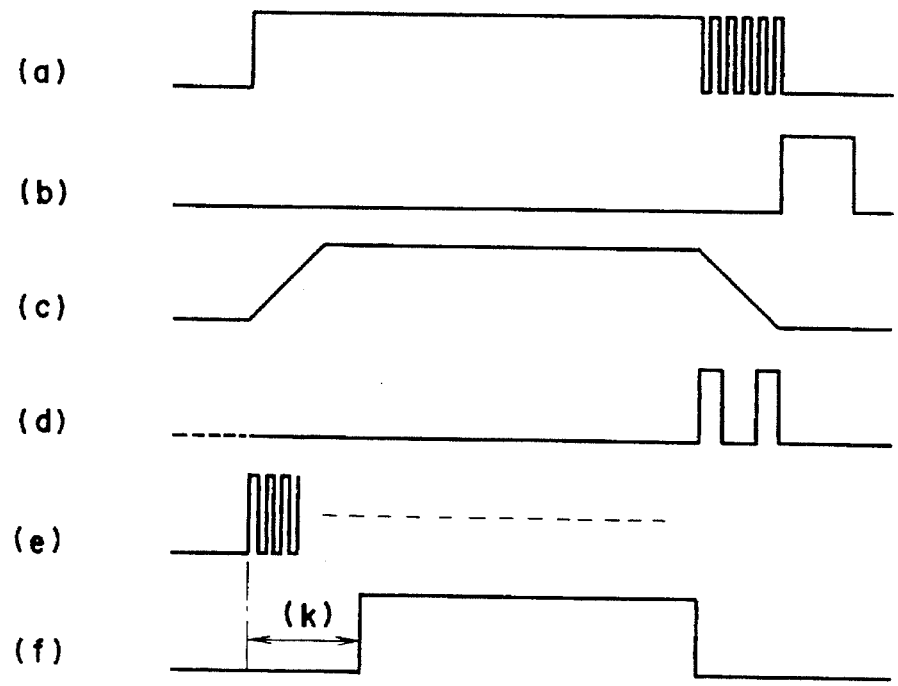
FIG. 9 is a timing chart showing signals in various parts of the device of the second embodiment.
Figure 8:
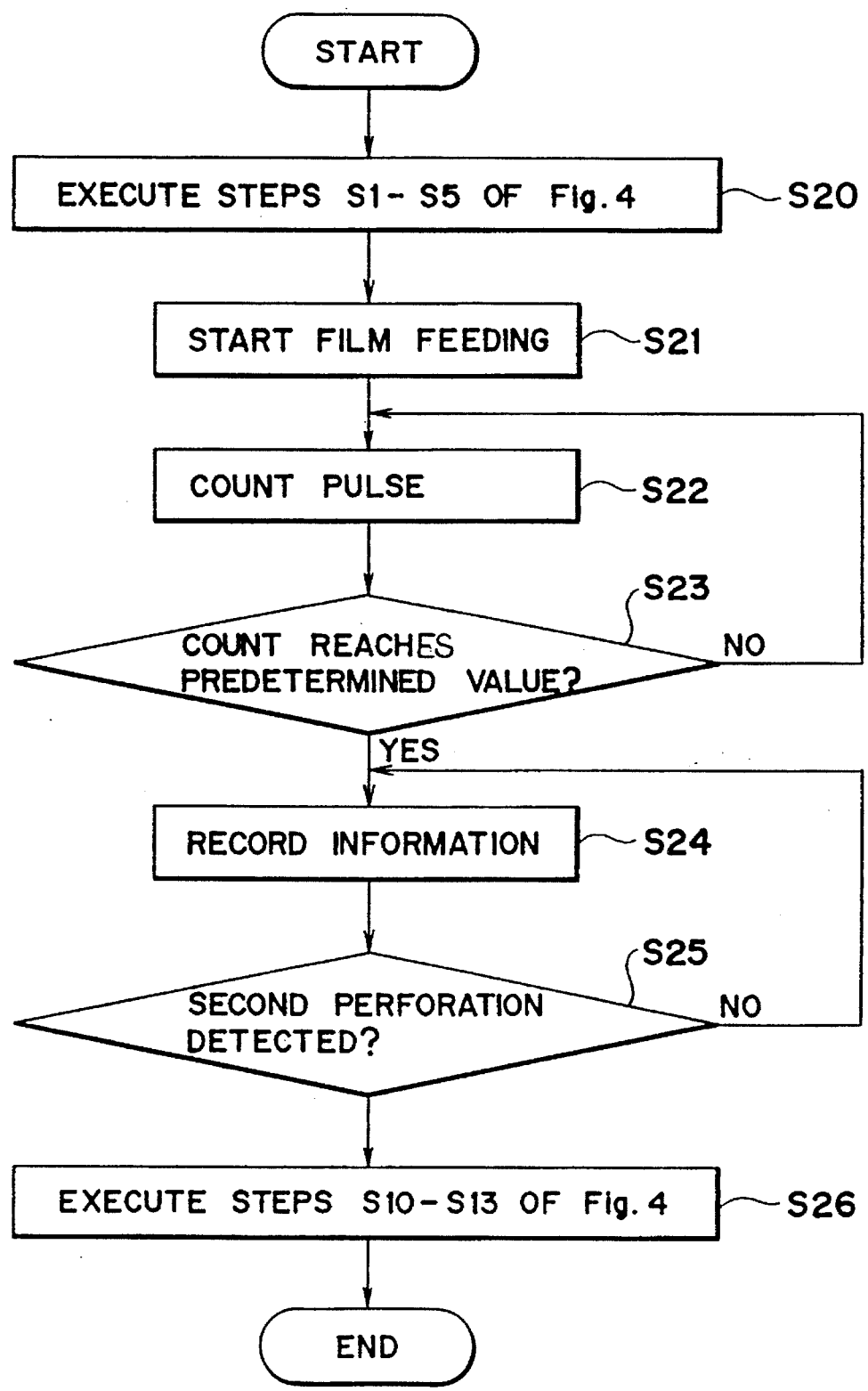
FIG. 8 is a flow chart showing an example of the control sequence for information recording position in the second embodiment.

FIG. 8 is a flow chart showing an example of control sequence executed by the microcomputer for controlling the information recording position, and FIG. 9 is a timing chart showing signals in various parts of the device shown in FIG. 6. FIG. 9 shows (a) a drive signal for the film feeding motor 3a; (b) a braking signal for the motor 3a; (c) the film feeding speed; (d) a perforation detection signal released from the perforation detector PS1; (e) pulse signals released from the pulse generator 20; and (f) the recording signal when the information recording is started after counting a predetermined number of pulse signals from the pulse generator 20. In the following there will be explained the function of the second embodiment, with reference to FIGS. 6 to 9.

A step S20 executes the processes of the steps S1 to S5 in FIG. 4, and a step S21 starts the feeding of the film 10. Then a step S22 counts the number of the pulse signals generated from the pulse generator 20 in the course of feeding of the film 10, then a step S23 discriminates, based on the count of the pulse signals, whether the film 10 has been advanced by an amount corresponding to the distance k, and the sequence porceeds to a step S24 or returns to the step 22 respectively if said advancement has been achieved or not.

The feed amount of the film 10 can be obtained by multiplying the feed amount per pulse by the count of the pulse signals. For example, if the feed amount per pulse is 0.1 mm, the feed amount is 10 mm for a pulse count of 100. In practice, it is desirable to detect a feed amount slightly longer than the distance k, in consideration of eventual variations in the temperature, power supply voltage, feeding speed etc.

When the film 10 is advanced by an amount corresponding to the distance k from the front end of the information recording area 11R of the image frame positioned opposite the exposure aperture to the magnetic recording head MH1, a step S24 starts the information recording as shown in FIG. 9(f). Then a step S25 discriminates whether the second perforation 11b of the image frame 11 has been detected by the perforation detector PS1, and the sequence proceeds to a step S26 or returns to the step S24 respectively if said perforation has been detected or not. The step S26 executes the processes of the steps S10 to S13 in FIG. 4.

Since the magnetic recording head MH1 is provided in a downstream position, in the film feeding direction, with respect to the front end of the information recording area of an image frame positioned opposite to the exposure aperture and the information recording is started upon detection, by means of the pulse generator 20 generating a pulse signal for every predetermined amount of film feeding, of the film feeding corresponding to the distance from the front end of the information recording area to the magnetic recording head MH1, as explained in the foregoing, it is rendered possible to record the information from the front end of the information recording area of the image frame and to secure a sufficient information recording capacity for each image frame.

Also since the magnetic recording head is provided in the downstream position in the film feeding direction in such a manner that the film feeding speed becomes constant by the time the front end of the information recording area reaches the magnetic recording head MH1 after the start of film feeding, the encoded phototaking information can be precisely recorded and properly decoded at the reproduction.

In the following there will be explained a third embodiment in which the perforations on the film are utilized for detecting the feed amount corresponding to the distance k between the front end of the information recording area and the magnetic recording head MH1.

Figure 10:
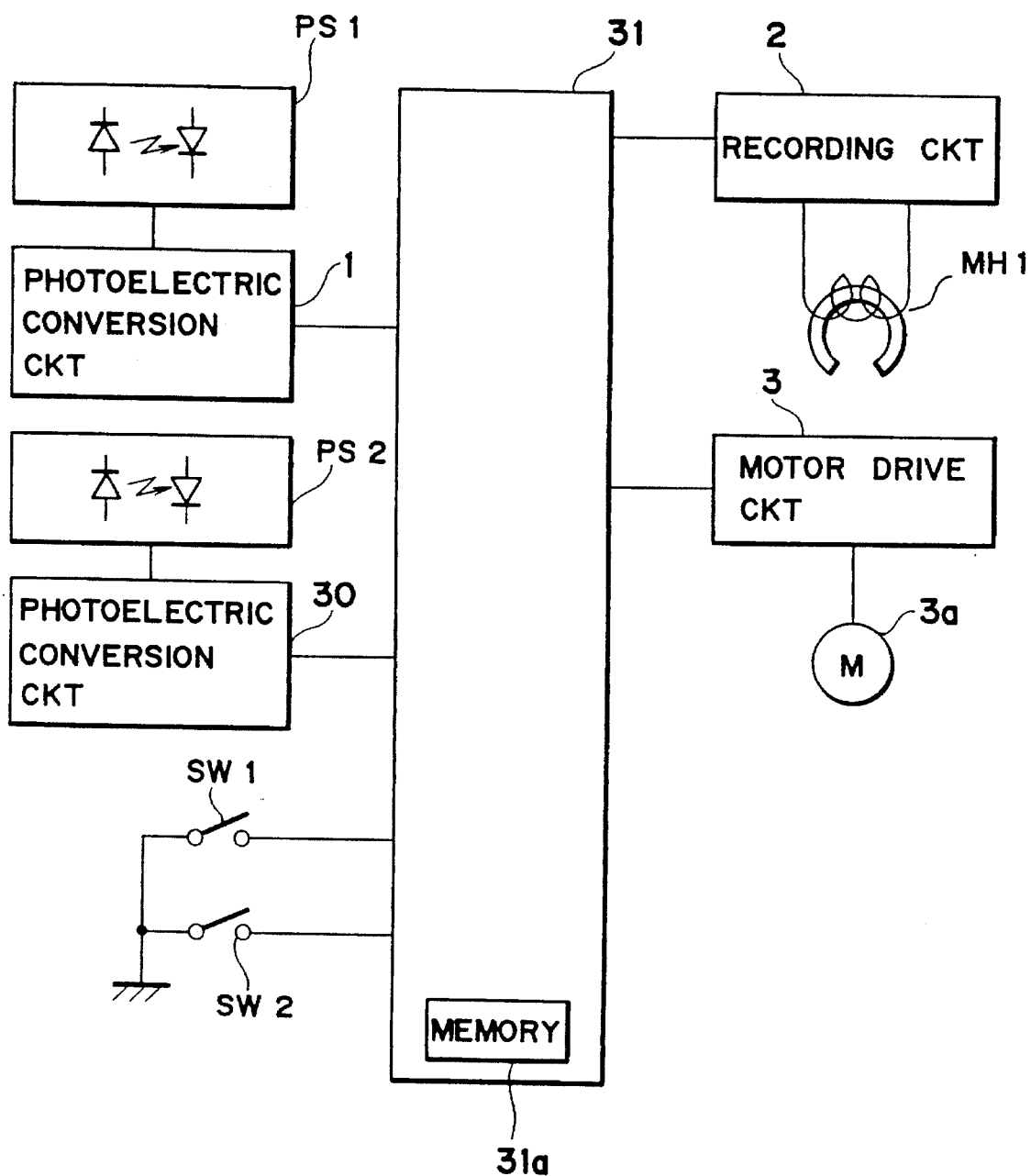
FIG. 10 is a block diagram of a third embodiment.

FIG. 10 is a block diagram showing configuration of the third embodiment, wherein components equivalent to those in FIG. 2 are represented by same symbols, and the following description will be concentrated on the different points from the foregoing embodiments.

A photoelectric conversion circuit 30 detects the perforations on the film by means of a perforation detector PS2 consisting of a light-emitting element and a light-receiving element, and converts the obtained detection signals into electrical signals. A control circuit 31, composed of a microcomputer and peripheral components such as a memory 31a, executes the sequence control of the camera and other various calculations, and also controls the information recording position by executing a control program to be explained later. Said memory 31a is used for storing the phototaking information.

In the above-explained configuration, the motor drive circuit 3 and the film feeding motor 3a constitute the film feeding means; the perforation detector PS2 and the photoelectric conversion circuit 30 constitute the film feed amount detecting means; the control circuit 31 constitutes the control means; and the magnetic recording head MH1 and the recording circuit 2 constitute the information recording means.

Figure 11A:
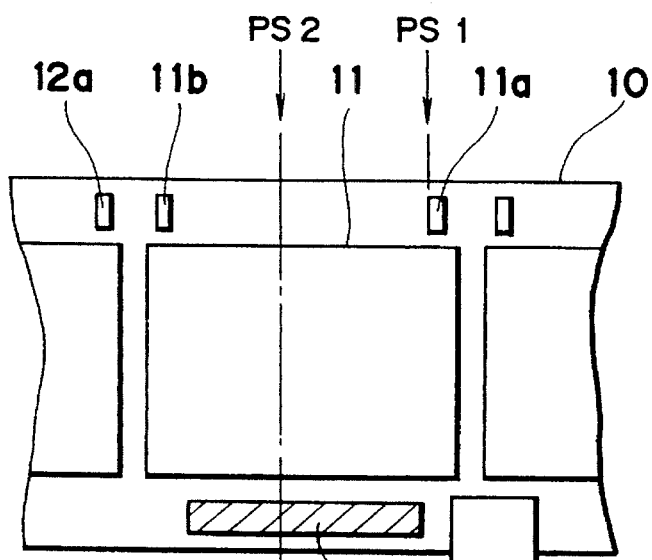
FIGS. 11A and 11B are views showing an example of the film employed in the third embodiment and its positional relationship to a magnetic recording head and a perforation detector.
Figure 11B:
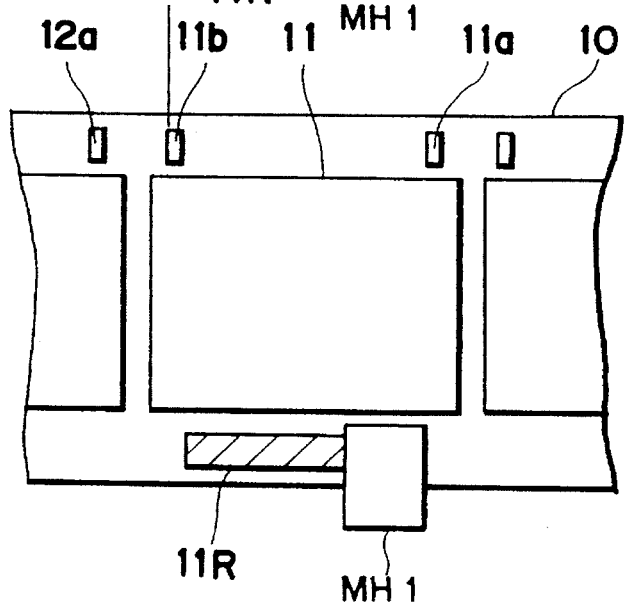

FIG. 11 illustrates the positional relationship between the film and the magnetic recording head MH1 or the perforation detectors PS1, PS2. The film is identical with that shown in FIG. 3 and will not, therefore, be explained further. In FIG. 11, (a) shows a state in which an image frame 11 of the film 10 is opposed to the exposure aperture, while (b) illustrates a state in which the front end of the information recording area 11R has reached the magnetic recording head MH1 as a result of film feeding started from the position shown in (a), namely a state in which the information recording is just started.

As in the second embodiment, the magnetic recording head MH1 is provided in a downstream position, in the film feeding direction, separated by the distance k from the front end of the information recording area 11R of the image frame 11 positioned opposite to the exposure aperture. Said distance k, as explained before, is selected at least equal to the film feeding amount required for the film 10 reach a constant feeding speed after the start of film feeding. The perforation detector PS2 is positioned downstream of the second perforation 11b, in the film feeding direction, by the distance k. The film feeding amount from the start of feeding of the film 10 to the detection of the second perforation 11b by the perforation detector PS2 corresponds to the distance k from the front end of the information recording area 11R of the image frame 11 positioned opposite to the exposure aperture to the magnetic recording head MH1. Consequently the phototaking information of the image frame 11 can be recorded from the front end of the information recording area 11R, by starting the information recording from a time when the second perforation 11b of the image frame 11 is detected by the perforation detector PS2.

Figure 12:
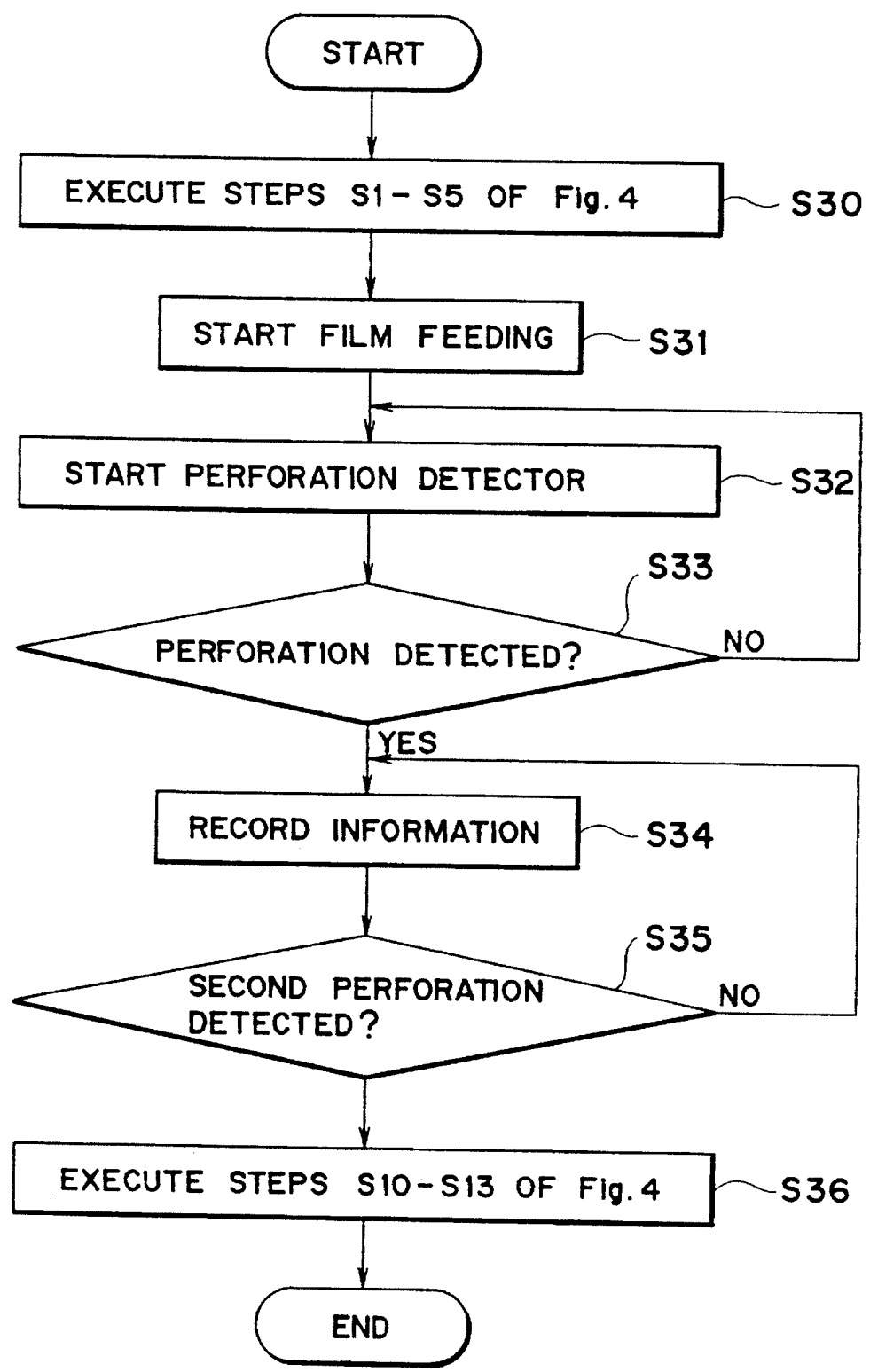
FIG. 12 is a flow chart showing an example of the control sequence for information recording position in the third embodiment.
Figure 13:
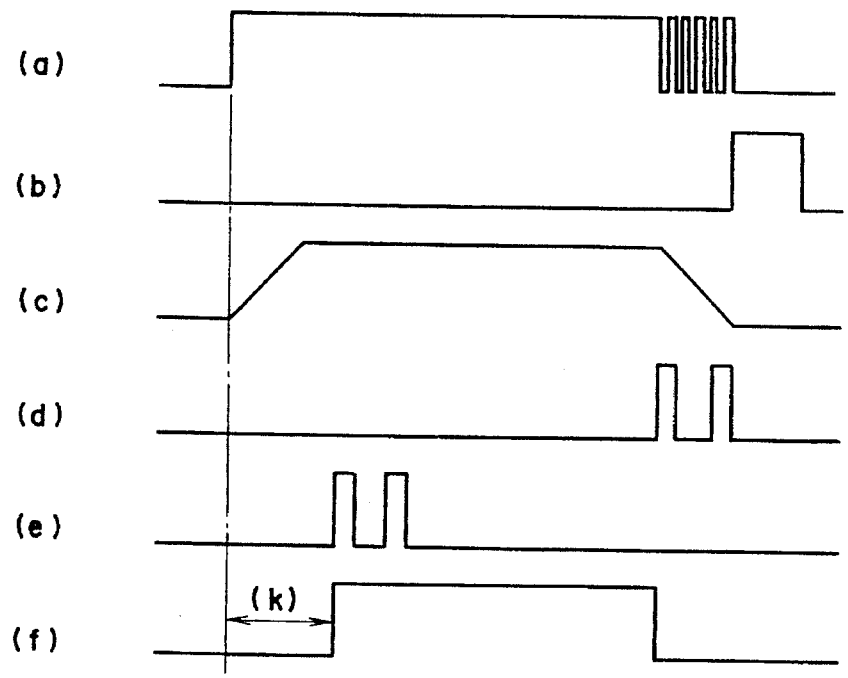
FIG. 13 is a timing chart showing signals in various parts of the device of the third embodiment.
Figure 14:
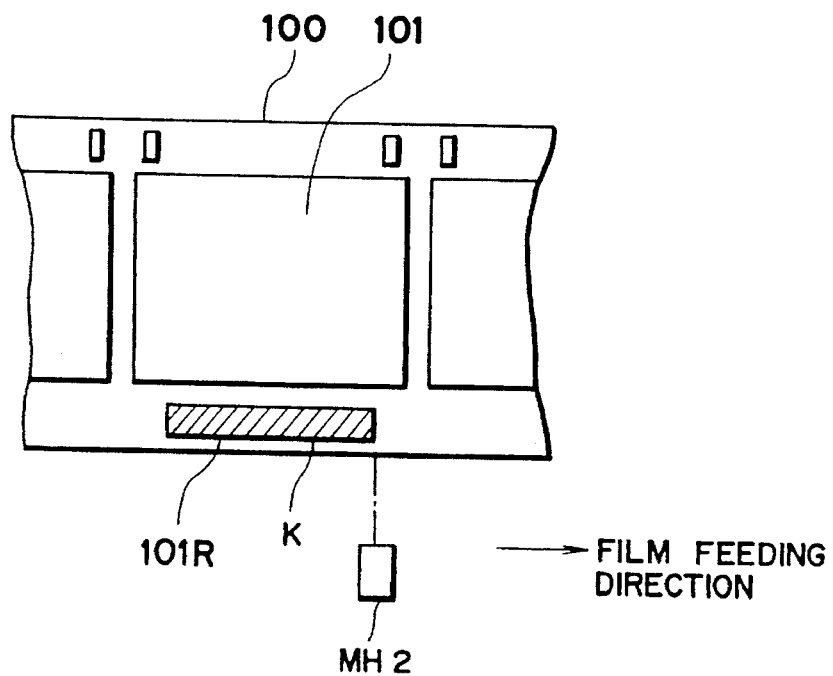
FIG. 14 is a view showing a configuration in which the information recording head is positioned at the front end of the information recording area.

FIG. 12 is a flow chart showing the control sequence for information recording position to be executed by the microcomputer, and FIG. 13 is a timing chart showing signals in various parts of the device shown in FIG. 10. FIG. 13 shows (a) a drive signal for the film feeding motor 31; (b) a braking signal for the motor 3a; (c) the feeding speed of the film 10; (d) a perforation detection signal released from the perforation detector PS1; (e) a perforation detection signal released from the perforation detector PS2; and (f) a recording signal in case the information recording is started from the detection of the second perforation of the image frame 11 by the perforation detector PS2. In the following there will be explained the function of the third embodiment, with reference to FIGS. 10 to 13.

At first a step S30 executes the processes of the steps S1 to S5 shown in FIG. 4, and a step S31 starts the feeding of the film 10. A step S32 activates the perforation detector PS2 for determining the timing of start of recording, and a next step S33 discriminates whether the second perforation 11b of the image frame 11 has been detected. Upon detection of said second perforation 11b by the perforation detector PS2, a step S34 initiates the information recording. A next step S35 discriminates whether the second perforation 11b of the image frame 11 has been detected by the perforation detector PS1, and the sequence proceeds to a step S36 or returns to the step S34 respectively if said perforation has been detected or not. The step S36 executes the processes of the steps S10 to S13 shown in FIG. 4.

In the present embodiment, as explained above, the magnetic recording head MH1 is provided in a downstream position, in the film feeding direction, separated by a distance k from the front end of the information recording area of an image frame positioned opposite to the exposure aperture, while the perforation detector PS2 is so positioned as to detect the perforation of the film after the film is advanced by an amount corresponding to said distance k after the start of film feeding, and the information recording is started when the perforation is detected by said perforation detector PS2. It is therefore rendered possible to record the information from the front end of the information recording area of the image frame and to secure a sufficient recording capacity for each image frame. Also since the magnetic recording head MH1 is positioned downstream in the film feeding direction, in such a manner that the film reaches a constant feeding speed by the time when the front end of the information recording area reaches the magnetic recording head MH1, the encoded phototaking information can be precisely recorded and properly decoded at the reproduction.

The foregoing embodiments employ magnetic recording with a magnetic recording head on a magnetic track provided on the film, but there may also be employed a light-emitting element for optically recording information on the film.

Also the foregoing embodiments employ a film having two perforations in each image frame, but the number of such perforations is not limited to that in the foregoing embodiments.

The present invention is applicable also in case of reproducing the information already recorded in the information recording area of each image frame, in the framewise film advancement. In such reproduction of information, if the reproduction is started immediately after the start of film feeding, the interval of the reproduced signals may be different from that of the recorded signals because of eventual variation in the film feeding speed, so that the recorded phototaking information may not be properly decoded. However, the recorded information of a desired image frame can be exactly reproduced by placing an information reproducing head in a downstream position, in the film feeding direction, also providing a timer with a time required for the front end of the information recording area to reach the information reproducing head, and starting the information reproduction upon expiration of the preset time, measured by said timer, after the start of film feeding. Also in this case, it is furthermore possible to measure the amount of film feeding after the start thereof and to start the information reproduction upon detection of a film feed amount corresponding to the distance from the front end of the information recording area to the information reproducing head.

What is claimed is:

1. An information recording device used in a camera, for recording information in information recording areas corresponding to respective image frames on a film as the film is advanced by film feeding means, comprising:

information recording means for recording information in said information recording areas, said information recording means being disposed so as to be in a downstream position in a film feeding direction with respect to a front end of the information recording area corresponding to an image frame positioned at an exposure position opposite to an exposure aperture of the camera;

timer means for measuring time elapsed from a start of film feeding by the film feeding means; and control means for causing said information recording means to start information recording in said corresponding information recording area in response to measurement by said timer means, after the start of film feeding of said image frame from the exposure position, of at least a predetermined time required for said front end of said corresponding information recording area to reach said information recording means.

2. An information recording device used in a camera, for recording information in information recording areas corresponding to respective image frames on a film as the film is advanced by film feeding means, comprising:

information recording means for recording information in said information recording areas, said information recording means being disposed so as to be in a downstream position at a predetermined distance in a film feeding direction from a front end of the information recording area corresponding to an image frame positioned at an exposure position opposite to an exposure aperture of the camera;

film feed amount measuring means for measuring a feed amount of the film fed by the film feeding means; and control means for causing said information recording means to start information recording in said corresponding information recording area in response to measurement by said film feed amount measuring means, after the start of film feeding of said image frame from the exposure position, of at least a predetermined film feed amount corresponding to said predetermined distance.

3. A device according to claim 2, wherein said film feed amount measuring means comprises a pulse generator capable of generating a signal for film feeding of a predetermined amount.

4. A device according to claim 2, wherein said film feed amount measuring means comprises a perforation detector which is so positioned as to detect a perforation on the film upon feeding thereof by a predetermined amount.

5. An information recording device for recording information in information recording areas corresponding to respective image frames on a film, comprising:

a recorder for recording information in said recording areas, said recorder and the film being relatively movable to each other, and said recorder being positioned so as to be spaced by a predetermined amount from a leading edge of a recording area stopped at a predetermined position;

a timer which measures a predetermined time required for relatively moving said recorder and the film by said predetermined amount to position said recorder opposite to said leading edge of said recording area, said timer starting the measurement of time at a predetermined point of time; and a controller electrically connected between said timer and said recorder and responsive to said timer for causing said recorder to start information recording in said recording area in response to completion of the measurement of said predetermined time by said timer.

6. An information recording device according to claim 5, further comprising a film feeding mechanism for advancing said film, and wherein said predetermined point of time is a time at which film advancement by said film feeding mechanism starts.

7. An information recording device according to claim 5, wherein said predetermined position corresponds to an image frame position opposite to an exposure aperture of the information recording device, and said recorder is spaced downstream from said leading edge in a film advancing direction.

8. An information recording device according to claim 5, wherein said information recording in said information recording areas by said recorder is performed by a relative movement between the recorder and said film after completion of the measurement of said predetermined time by said timer.

9. An information recording device according to claim 5, wherein said predetermined time is at least a time required for said relative movement of said recorder and said film to reach a predetermined speed for information recording.

10. An information recording device for recording information in information recording areas corresponding to respective image frames on a film, comprising:

a recorder for recording information in said recording areas, said recorder and the film being relatively movable to each other, and said recorder being positioned so as to be spaced by a predetermined amount from a leading edge of a recording area stopped at a predetermined position;

a film feeding amount measuring device which measures an amount of the relative movement between said recorder and said film until said predetermined amount is reached to position said recorder opposite to said leading edge of said recording area, said film feeding amount measuring device starting the measurement at a predetermined point of time; and a controller electrically connected between said film feeding amount measuring device and said recorder and responsive to said film feeding amount measuring device for causing said recorder to start information recording in said recording area in response to completion of the measurement by said film feeding amount measurement device.

11. An information recording device according to claim 10, further comprising a film feeding mechanism for advancing said film, and wherein said predetermined point of time is a time at which film advancement by said film feeding mechanism starts.

12. An information recording device according to claim 10, wherein said predetermined position corresponds to an image frame position opposite to an exposure aperture of the information recording device, and said recorder is spaced downstream from said leading edge in a film advancing direction.

13. An information recording device according to claim 10, wherein said information recording in said information recording areas by said recorder is performed upon a relative movement between the recorder and said film after completion of the measurement by said film feeding amount measuring device.

14. An information recording device according to claim 10, wherein said predetermined amount is at least an amount required for said relative movement of said recorder and said film to reach a predetermined speed for information recording.

15. An information recording method for recording information in information recording areas corresponding to respective image frames on a film, comprising the steps of:

moving a recorder, which records information in said recording areas, and the film relative to each other;

measuring a predetermined time required for said relative movement to reach a predetermined amount at which the recorder is positioned opposite to a leading edge of a said recording area, the measurement of the predetermined time being started at a predetermined point of time; and causing said recorder to start information recording in said recording area in response to completion of the measurement of said predetermined time.

16. An information recording method according to claim 15, wherein said predetermined time is at least a time required for said relative movement of said recorder and said film to reach a predetermined speed for information recording.

17. An information recording method for recording information in information recording areas corresponding to respective image frames on a film, comprising:

moving a recorder, which records information in said recording areas, and the film relative to each other;

measuring an amount of the relative movement between said recorder and said film until a predetermined amount is reached to position said recorder opposite to a leading edge of a said recording area, the measurement being started at a predetermined point of time; and causing said recorder to start information recording in said recording area in response to completion of the measurement of the predetermined amount of the relative movement.

18. An information recording method according to claim 17, wherein said predetermined amount is at least an amount required for said relative movement of said recorder and said film to reach a predetermined speed for information recording.

* * * * *